US006384109B1

(12) United States Patent
Witecki, Jr.

(10) Patent No.: US 6,384,109 B1
(45) Date of Patent: May 7, 2002

(54) POLYMER MAKE-DOWN UNIT WITH FLUSHING FEATURE

(75) Inventor: William S. Witecki, Jr., Middlefield, CT (US)

(73) Assignee: Proflow, Inc., North Haven, CT (US)

( * ) Notice: Subject to any disclaimer, the term of this patent is extended or adjusted under 35 U.S.C. 154(b) by 0 days.

(21) Appl. No.: 09/276,023

(22) Filed: Mar. 25, 1999

(51) Int. Cl.⁷ .............................. B01F 15/02; C09J 3/05
(52) U.S. Cl. .................. 523/348; 366/136; 366/137; 366/138; 366/152.1; 523/318
(58) Field of Search ................. 366/136, 137, 366/138, 152.1; 523/348, 318

(56) References Cited

U.S. PATENT DOCUMENTS

| | | | |
|---|---|---|---|
| 4,485,840 A | * 12/1984 | Erwin | 137/240 |
| 4,688,945 A | 8/1987 | Brazelton et al. | 366/156 |
| 4,778,280 A | 10/1988 | Brazelton | 366/136 |
| 4,920,519 A | 4/1990 | Brazelton et al. | 366/160 |
| 5,018,870 A | 5/1991 | Brazelton et al. | 366/161 |
| 5,018,871 A | 5/1991 | Brazelton et al. | 366/168 |
| 5,061,456 A | 10/1991 | Brazelton et al. | 422/134 |
| 5,164,429 A | 11/1992 | Brazelton et al. | 523/322 |
| 5,284,626 A | 2/1994 | Brazelton et al. | 422/135 |
| 5,284,627 A | 2/1994 | Brazelton et al. | 422/135 |
| 5,323,017 A | 6/1994 | Pardikes | 250/573 |
| 5,338,779 A | 8/1994 | Brazelton et al. | 523/313 |
| 5,372,421 A | 12/1994 | Pardikes | 366/137 |
| 5,403,552 A | 4/1995 | Pardikes | 422/62 |
| 5,407,975 A | 4/1995 | Pardikes | 523/348 |
| 5,470,150 A | 11/1995 | Pardikes | 366/137 |
| 5,556,033 A | * 9/1996 | Nachtman | 239/343 |
| 5,599,101 A | 2/1997 | Pardikes | 366/165.1 |
| 5,728,780 A | * 3/1998 | Masuko et al. | 526/62 |
| 5,823,670 A | * 10/1998 | Rushin et al. | |

\* cited by examiner

*Primary Examiner*—Peter Szekely
(74) *Attorney, Agent, or Firm*—Sofer & Haroun L.L.P.

(57) ABSTRACT

A polymer make-down system comprising: a mixing pump; a water source for providing a first quantity of water to piping at a suction end of the mixing pump; and a polymer source for providing a first quantity of polymer to piping at the suction end of the mixing pump; wherein the system is configured such that, after the first quantities of water and polymer have been mixed, a second quantity of water is provided so as to flush the mixture of the first quantities of water and polymer from the system. In another embodiment, the system further comprises a polymer check valve between the polymer source and the suction end of the mixing pump, wherein the polymer check valve is configured to prevent a flow of water to the polymer source. In another embodiment, the system further comprises recirculation piping coupled to piping at a discharge end of the mixing pump and to piping at an outlet end of the polymer check valve, wherein the recirculation piping is configured to be flushed by the second quantity of water. In accordance with still another embodiment, the water source further comprises a water buffer tank configured to gravity feed the first and second quantities of water into the system. In still another embodiment, the system further comprises a check valve at the discharge end of the system so as to prevent a backflow of liquid into the system.

7 Claims, 2 Drawing Sheets

US 6,384,109 B1

POLYMER MAKE-DOWN UNIT WITH FLUSHING FEATURE

FIELD OF THE INVENTION

The present invention is directed to a polymer make-down unit. More particularly, the invention is directed to an apparatus and method for flushing out piping and equipment that contains polymer emulsion.

BACKGROUND OF THE INVENTION

Generally, a polymer (also known as a "polyelectrolyte") is a chemical compound made up of repeating structural units which are comprised mainly of carbon and hydrogen. Each structural unit is referred to as a monomer, and by a process referred to as polymerization, the monomers are linked together to form long chains. Polymers typically carry an electrostatic charge, which, depending on the type of charge, attract particles which the polymer is exposed to and gives a polymer properties that make it suitable for specific industrial and manufacturing uses, as will be further discussed below.

The three types of electrostatic charge that a polymer may carry are positive, negative and no charge. When a polymer is comprised of positively charged units, e.g.—when it gets its charge from positively charged nitrogen atoms, the polymer is referred to as cationic. When a polymer is comprised of negatively charged units, e.g.—when it gets its charge from negatively charged oxygen atoms, the polymer is referred to as anionic. If the charge on the polymer is zero, e.g.—either because of an equal amount of positively and negatively charged units, or because of an absence of any charged units along its length, the polymer is referred to as nonionic.

There are many industrial and manufacturing processes in which polymers are used. For instance, polymers are commonly used in purification and flocculation processes by water treatment equipment to facilitate the separation of liquid and solid waste. In this case, the extremely large molecules of a polymer, having millions of charge sites, attract oppositely charged particles that are suspended in the water. Additionally, polymers are employed in chemical processing, coal preparation, painting, petroleum refining, plastics, petrochemicals, mining and mineral recovery, steel, textiles, phosphate and pulp and paper industries, as well as the previously mentioned water treatment and wastewater management systems and many other industrial and manufacturing processes. In these industries, polymers are typically employed to capture or recover, for further processing, particles or other solids which are produced as byproducts of the original industrial processes.

Polymers are typically available in either dry or liquid form, each of which has inherent advantages and disadvantages. One disadvantage of dry polymer is that it is required to be mixed with a large quantity of water in order to activate it (activation is discussed in detail below). The mixture of dry polymer with water can be problematic, as dry polymer typically does not readily mix with water, i.e.—agglomeration, characterized by unmixed pockets or bubbles of dry polymer, commonly occurs. Liquid polymer, on the other hand, is typically required to be mixed only with a small quantity of water, if any at all. Thus, liquid polymer has the advantage that it is premixed with a quantity of water that has been predetermined to insure optimal activation, or to which only a small quantity of water needs to be added to insure optimal activation. Additionally, liquid polymer is not subject to agglomeration since it has been premixed.

However, dry polymer has the advantage over liquid polymer of having a lighter shipping weight, which significantly reduces the cost to ship the polymer. Additionally, dry polymer has a longer storage shelf-life than liquid polymer and can be stored in inexpensive sacks as opposed to large drums and tanks.

Regardless of whether dry polymer or liquid polymer is employed, it is typically desired that polymer form a polymer emulsion prior to its use in a process. A polymer emulsion is a milk-like liquid mixture that is ideal for many polymer applications, and is formed by mixing unactivated polymer with water (the mixing process is also known as "make-down"). In an unactivated state, the molecules of a polymer are typically in a coiled configuration. The coiled configuration of the molecules reduces the viscosity of the polymer and generally renders the polymer useless.

In order to be emulsified or activated, a sufficient amount of energy must be imparted to the mixture in addition to mixing the polymer with water. Energy is typically imparted to the mixture by vigorously agitating the mixture, such as by passing it through a pump or subjecting the mixture to blenders or beaters. This agitation causes the molecules of the polymer to uncoil in an extended chain-type arrangement. The exact amount of energy required for the activation of the polymer emulsion varies depending on the molecular weight of the polymer, the concentration of the solution, among other factors.

After being mixed with water, the polymer is typically aged in an aging tank, where any partially uncoiled polymer chains are permitted to completely uncoil and thus become fully activated. Since polymer is typically most useful when the polymer chains are completely uncoiled, it is common for the polymer to be activated in batches, each batch being permitted to age prior to its usage. When polymer has been fully activated, there is likely to be an increase in the viscosity of the polymer solution because of the full extension of the coil-like chain of molecules.

However, as is well known in the art, polymer that has been mixed with water and is partially activated eventually forms a gel-like substance when left in the piping and equipment of a polymer make-down system. Given sufficient time, the made-down polymer will even dry into a solid or plastic-like state. When this occurs in the piping and equipment of a polymer system, component fouling results. In order to avoid component fouling, polymer residue, which remains in piping and equipment after the polymer has been mixed and discharged from the system, must be removed from the piping and equipment. In a batch operation system, the piping and equipment of the system is subject to component fouling every time a batch is made.

Several patents disclose systems for mixing polymer and water to activate the polymer. For instance, U.S. Pat. No. 5,372,421 to Pardikes for a "Method of Inverting, Mixing and Activating Polymers" disloses a method wherein polymer and a diluent are blended in a derated centrifugal pump and the polymer in the polymer/diluent mixture is relaxed by relaxing the system pressure. The relaxation of the pressure is accomplished by the use of a mixing pressure regulator, which causes polymer that passes through it to experience a sudden and abrupt pressure drop that facilitates the uncoiling of the polymer chain.

U.S. Pat. No. 5,407,975 to Pardikes for a "Dry Polymer and Electrolyte Mixing System" disloses a funnel that has an inner wall along which water is swirled. Dry polymer is dropped into the vortex of the funnel to be wetted, and the wetted polymer is dropped through the spout of the funnel into the impeller of a pump. The pump transfers the mixure to a mixing vessel where a large volume of air is blown through the mixture so as to enhance its viscosity.

U.S. Pat. No. 4,778,280 to Brazelton for "Mixing Apparatus" discloses a mixing apparatus having a first casings disposed above a second casing, but inverted in orientation. Dry polymer is guided by a funnel into water that is swirling tangentially within the first casing. A region of lower pressure is established at the discharge of the first casing by the swirling action, and causes the polymer and water to be drawn down into the second casing where it is vigorously mixed by the second casing's impeller.

U.S. Pat. No. 5,338,779 to Brazelton for "Dry Polymer Activation Apparatus and Method" discloses an apparatus for activating a batch of dry polymer in dilution water. The apparatus includes a tank with dilution water, which is circulated at a high rate through a mixing assembly. The high rate of circulation through the mixing assembly causes a high shear flow condition, into which the polymer is dispersed to form a slurry. After dispersation and before hydration of the polymer, the rate of circulation through the mixing assembly is reduced to create a low shear flow condition, which permits the viscosity of the solution to increase.

However, none of the patents in the prior art, including the patents cited above, disclose a system or method in which the mixture of polymer and water is flushed from the piping and equipment so as to prevent component fouling.

Therefore, there exists a need for an apparatus and method for periodically and systematically flushing out polymer process piping and equipment.

SUMMARY OF THE INVENTION

The present invention, in accordance with one embodiment, is directed to a polymer make-down system having a mixing pump, a water source for providing a first quantity of water to piping at a suction end of the mixing pump, and a polymer source for providing a first quantity of polymer to piping at the suction end of the mixing pump. The system is configured so that, after the first quantities of water and polymer have been mixed, a second quantity of water is provided so as to flush the mixture of the first quantities of water and polymer from the system.

In accordance with another embodiment, the system is further provided with a polymer check valve between the polymer source and the suction end of the mixing pump. The polymer check valve is configured to prevent a flow of water to the polymer source. In accordance with still another embodiment, the system is further provided with recirculation piping coupled to piping at a discharge end of the mixing pump and to piping at an outlet end of the polymer check valve, such that the recirculation piping is configured to be flushed by the second quantity of water. In accordance with still another embodiment, the water source further comprises a water buffer tank configured to gravity feed the first and second quantities of water into the system. In accordance with still another embodiment, the system further comprises a flow meter for measuring the first quantity of water provided by the water source, and a water flow valve for adjusting a flow of the first quantity of water.

BRIEF DESCRIPTION OF THE DRAWINGS

In the drawings, in which like reference characters denote similar elements throughout the several views.

DETAILED DESCRIPTION OF THE PRESENTLY PREFERRED EMBODIMENTS

Figure 1:
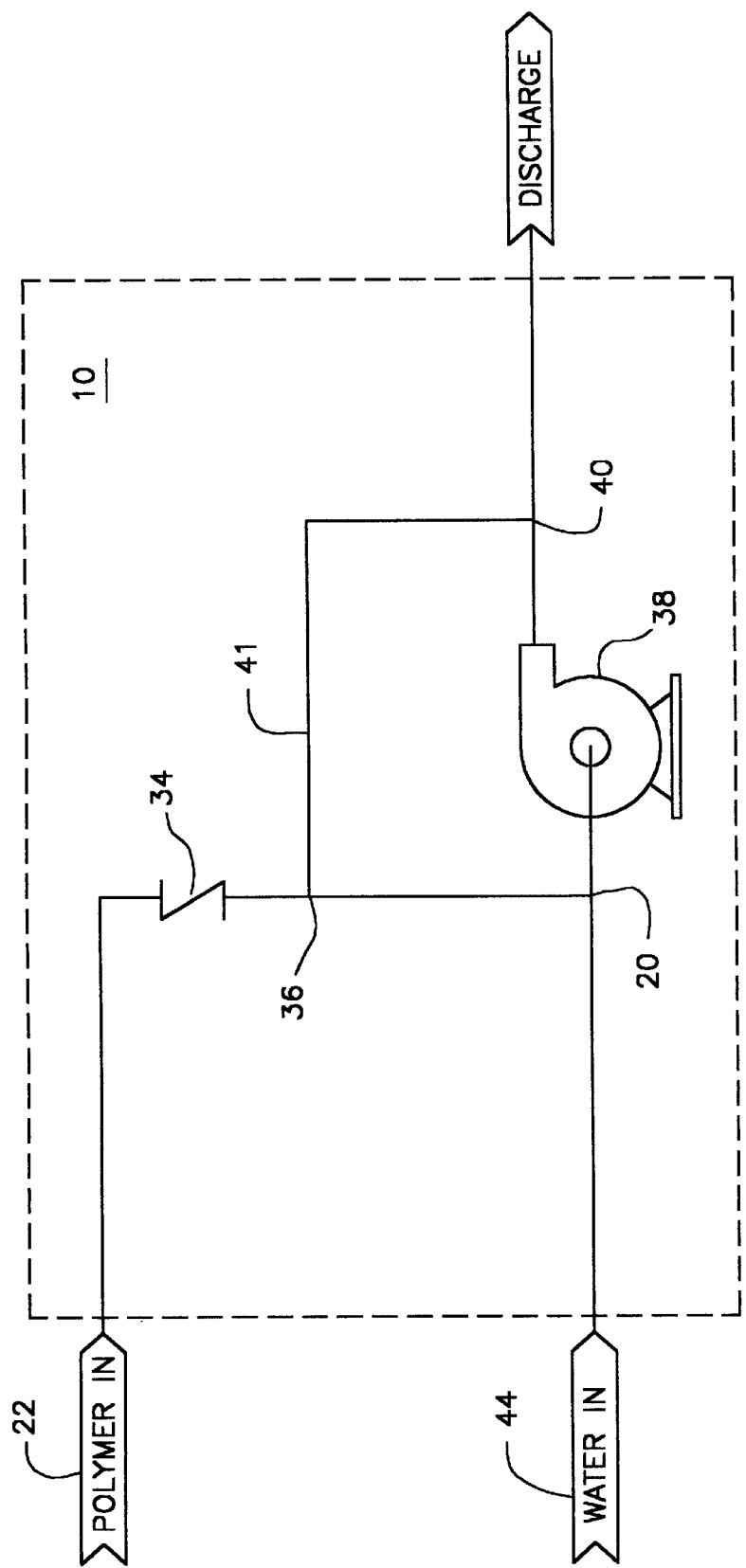
FIG. 1 is a flow diagram that illustrates a polymer make-down unit with a flushing feature, in accordance with one embodiment of the present invention.

FIG. 1 is a flow diagram that illustrates a polymer make-down unit with a flushing feature, in accordance with one embodiment of the present invention. Make-down unit 10 comprises water source 44 which is coupled to a first end of tee 20. Polymer source 22 is coupled to an inlet end of polymer check valve 34, which is configured to allow a flow from its inlet end to its outlet end only if the difference between the pressure at the inlet end and the pressure at the outlet end exceeds a predetermined amount. The outlet end of check valve 34 is coupled to a first end of tee 36. A second end of tee 36 is coupled to a second end of tee 20. A third end of tee 20 is coupled to a suction end of mixing pump 38. A discharge end of mixing pump 38 is coupled to a first end of tee 40, while a second end of tee 40 operates as a discharge of make-down unit 10. A third end of tee 40 is coupled to a third end of tee 36 via recirculation piping 41.

During operation, according to one embodiment, a first quantity of polymer is provided by polymer source 22 through check valve 34 to tee 20, where the polymer is partially mixed with a first quantity of water provided by water source 44. The partial mixture is drawn into suction pump 38 and discharged to tee 40. According to one embodiment, the mixture discharged from pump 38 is directed through the third end of tee 40 and received at tee 36. At tee 36, additional polymer which is flowing through polymer check valve 34 is mixed with the mixture discharged by pump 38, and the new mixture is directed to tee 20 and then to pump 38 again. Improved mixing is accomplished via the recirculation via recirculation piping 41 of the partial mixture through the pump again.

When a batch of polymer has been mixed and discharged by unit 10, the supply of polymer from polymer source 22 is stopped, thus decreasing the pressure at the inlet end of check valve 34. Unit 10 is configured, according to one embodiment of the invention, to supply a second quantity of water via water source 44 so as to flush the system of partially mixed polymer. Unit 10 is configured, according to one embodiment, to continue to supply flushing water for a predetermined amount of time or until a predetermined amount of flushing water has been supplied. With little or no pressure at the inlet end of check valve 34, flushing water is circulated through first, second and third ends of tee 20, through mixing pump 38, through first, second and third ends of tee 40, through recirculation piping 41 and through second and third ends of tee 36. Flushing water is not circulated through the first end of tee 36 to polymer check valve 34, because polymer check valve 34 is configured to prevent water or water/polymer mixture from flowing back to polymer source 22.

Advantageously, the flushing water is discharged to a makedown or aging tank, which will be discussed further below. In one embodiment, wherein the mixture quantities of the water and polymer are critical, a three-way valve or a two-way solenoid valve is disposed in the discharge line so as to discharge the flushed polymer to the sewer or to another suitable drain upon shutdown of the system. In this same embodiment, the system may also be configured so as to discharge any flushing water in the pipes into the sewer or another suitable drain upon startup of the system.

Regardless, the flushing cycle is preferably initiated by a programmable logic controller after a high-level makedown tank signal is received by the programmable logic controller, as will be discussed below.

Figure 2:
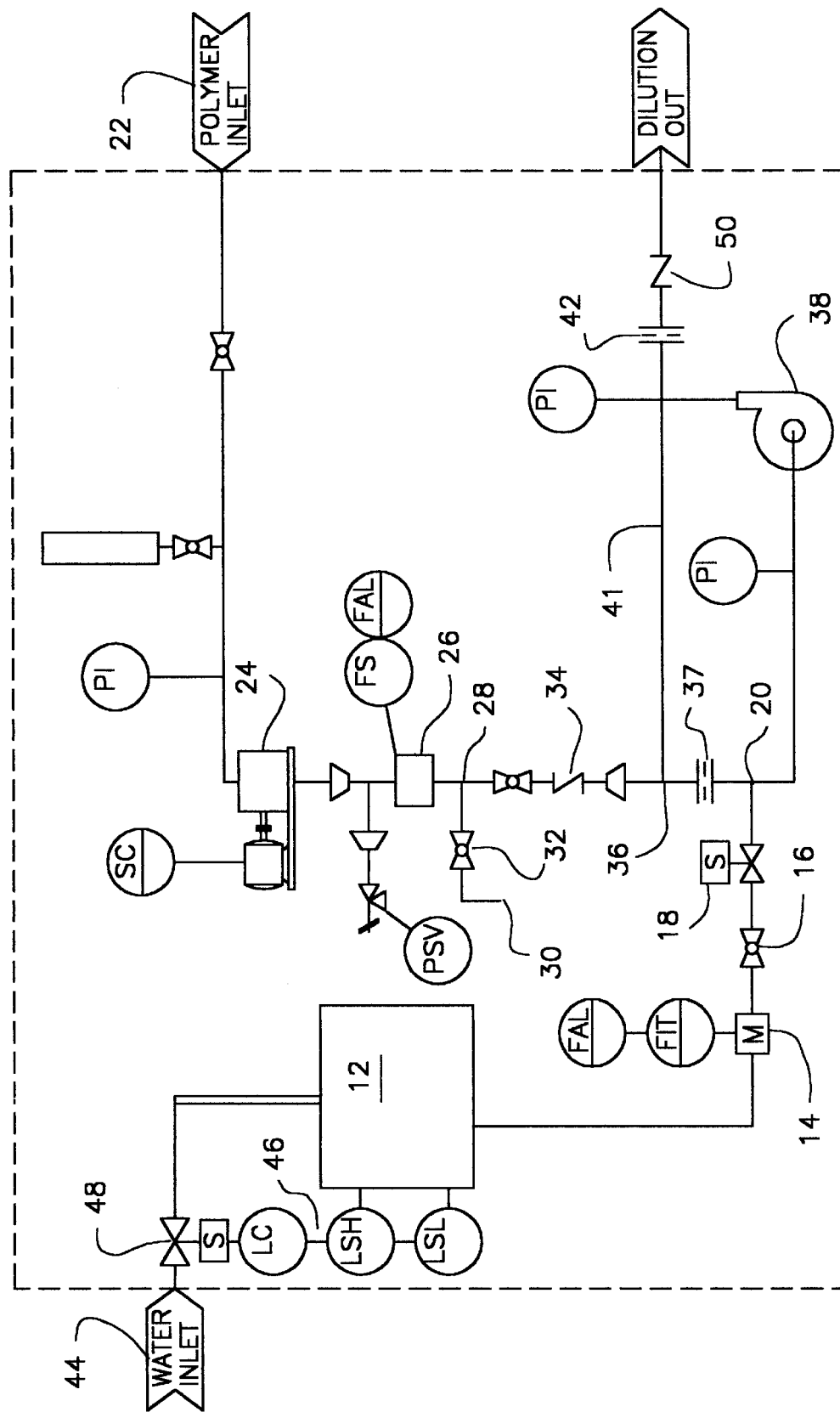
FIG. 2 is a schematic diagram that illustrates additional features of a polymer make-down unit with a flushing feature, in accordance with another embodiment of the present invention.

FIG. 2 is a schematic diagram that illustrates additional features of polymer make-down unit 10 with a flushing feature, in accordance with one embodiment of the present invention. In this embodiment, additional components permit automatic control of at least some components of the system. As shown in FIG. 2, make-down unit 10 comprises water buffer tank 12, which is coupled, according to one embodiment, to water flow meter 14, water flow control valve 16 and isolation solenoid 18 arranged in series. Isolation solenoid 18 is coupled to a first end of tee 20.

Additionally, polymer source 22 is coupled to a suction end of polymer pump 24. A discharge end of polymer pump 24, according to one embodiment, is coupled to polymer flow switch 26, which is coupled to a first end of tee 28. A second end of tee 28 is coupled to sample port 30 via valve 32. A third end of tee 28 is coupled to an inlet end of polymer check valve 34, which is configured to allow a flow from its inlet end to its outlet end only if the difference between the pressure at the inlet end and the pressure at the outlet end exceeds a predetermined amount. The outlet end of check valve 34 is coupled to a first end of tee 36.

A second end of tee 36 is coupled to a second end of tee 20. A third end of tee 20 is coupled to a suction end of mixing pump 38. A discharge end of mixing pump 38 is coupled to a first end of tee 40, while a second end of tee 40 is coupled to flow control nozzle 42 and check valve 50. A third end of tee 40 is coupled via recirculation piping 41 to a third end of tee 36. Additionally, according to various embodiments, programmable logic controller (hereinafter "PLC") 46 is electrically coupled to at least one of water source valve 48, tank level meter 50, water flow meter 14, isolation solenoid 18, mixing pump 38, polymer pump 24 and polymer flow meter 26.

Buffer tank 12 is preferably an elevated tank of water that receives a flow of water from water source 44. It is noted that, according to one embodiment of the invention, buffer tank 12 is eliminated and water source 44, such as a pressurized water line, feeds water directly into make-down unit 10. However, buffer tank 12 is preferred because, according to one embodiment, it gravity-feeds water into make-down unit 10 at a substantially constant pressure so as to protect the system against fluctuations in the pressure of water source 44, which can result in less than optimum mixing and activation of the polymer.

According to one embodiment, PLC 46 is electrically coupled to water source valve 48 and to tank level meter 50 in buffer tank 12. In one embodiment, tank level meter comprises at least one float switch which is activated when the water in the tank lifts a buoyant element of the float switch, although any type of level measuring apparatus is contemplated by the present invention. In one embodiment, PLC 46 receives a signal from tank level meter 50 when the water level in tank 12 reaches a predetermined point, and causes a signal to be sent to valve 48. For instance, when the water level in tank 12 is low (thus activating level switch low, also shown as "LSL"), PLC 46 sends a signal to open valve 48, and when the water level in tank 12 is high (thus activating level switch high, also shown as "LSH"), PLC 46 sends a signal to close valve 48, thus insuring a substantially constant water level in the tank..

Water flows from buffer tank 12 through flow meter 14, which is electrically coupled to PLC 46. Flow meter 14 sends an electrical signal to PLC 46 corresponding to the amount of water that is flowing through the flow meter. Water then flows through flow control valve 16 and isolation solenoid 18, to arrive at a first end of tee 20. In the currently preferred embodiment, flow control valve 16 is a manually operated valve, which is set by hand by an operator so as to set the flow of water therethrough, although the invention is not limited in scope in this regard. Generally, the flow of water is regulated so as to insure that the polymer is activated with an optimal amount of water.

Additionally, in the embodiment shown, polymer is supplied by polymer source 22 and is pumped by polymer pump 24 through polymer flow meter 26. Polymer flow meter 26 sends an electrical signal to PLC 46 corresponding to the amount of polymer that is flowing through the flow meter. Polymer then arrives at a first end of tee 28, through which it can either be sampled from sample port 30 or flow through to polymer check valve 34. The polymer flow, according to one embodiment, is adjusted by regulating the speed of polymer pump 24. In one embodiment, this is accomplished by an operator who manually sets a potentiometer based upon a flow rate measured through a calibration column coupled thereto, although the present invention is not limited in scope in this regard.

Polymer flows through polymer check valve 34, which as previously described, is configured to allow a flow from its inlet end to its outlet end only if the difference between the pressure at the inlet end and the pressure at the outlet end exceeds a predetermined amount. During operation, polymer flows through tee 36 to tee 20, at which point polymer is injected into the flow of water.

According to one embodiment, nozzle 37 is disposed between tee 36 and tee 20 to increase the pressure and velocity of the polymer as it is injected into the flow of water, thus facilitating the mixing of the polymer and the water. The increased velocity allows for increased dispersion of the polymer in the water and also causes agitation of the flow that provides increased activation of the polymer. The partial mixture of polymer and water enters the suction end of mixing pump 38, which further mixes the polymer and water and discharges the mixture to tee 40. According to one embodiment, some of the polymer and water discharged by pump 38 is discharged from the system, such as to an aging tank or other process equipment.

According to one embodiment, flow control nozzle 42 is coupled to the second end of tee 40 and restricts the flow of at least some of the mixed water and polymer that is discharged from pump 38, thus causing some of the mixed water and polymer that is discharged from pump 38 to be recirculated through tee 40 to tee 36, where it will be injected into the flow of water at tee 20 again. In this manner, additional mixing is facilitated so as to insure optimal activation of the polymer. As previously indicated, PLC 46 receives and sends signals to the various components of the system so as to automatically control at least some of the functions of the system, such as insuring that the flows of the water and polymer are optimal. Check valve 50 is disposed in the discharge piping of the system so as to prevent a backflow of liquid into the system.

According to one embodiment of the invention, the flushing feature of the polymer make-down system is also at least partially automatic controlled by PLC 46. As previously discussed, when a batch of polymer has been mixed, the partially mixed first quantities of polymer and water remains in the piping downstream of polymer check valve 34, where it will solidify and foul the components if not flushed out (upstream of polymer check valve 34, however, is unactivated polymer which will not solidify in the absence of water). After a first quantity of polymer has been supplied, PLC 46 sends an electrical signal to polymer pump 24 that shuts the polymer pump off. The pressure at the inlet end of polymer check valve 34 is decreased so that the difference in pressure between the inlet end and outlet end are less than the predetermined amount, thus shutting the flow in either direction through valve 34.

Controlled by PLC 46, a second quantity of water is provided by buffer tank 12, where it is recirculated through the piping of the system by mixing pump 38. The second quantity of water flushes any remaining polymer or water/polymer mixture out of the pipes. After a predetermined amount of time has elapsed or a predetermined amount of flushing water has been introduced, PLC 46 removes an electrical signal from isolation solenoid 18 to stop water from flowing through the system. According to one embodiment, the amount of flushing water used corresponds to the volume of piping to be flushed by the system.

It is noted that, throughout the present application, references that the components of make-down unit 10 are coupled via piping is not intended to limit the scope of the invention. The present invention contemplates the use of any suitable conduit known to those skilled in the art, including but not limited to flexible hosing or tubing.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. A method for operating a polymer make-down system, said method comprising:

providing via a water source a first quantity of water to piping at a suction end of a mixing pump;

providing via a polymer source a first quantity of polymer to said piping at said suction end of said mixing pump;

mixing through said mixing pump said first quantities of water and polymer to form a batch of polymer;

discharging said batch of polymer thereby leaving a residual quantity of water and polymer in said polymer make-down system;

providing a make-down tank signal for determining a second quantity of water so as to flush said residual quantity of water and polymer from said system; and providing via said water source said second quantity of water so as to flush said residual quantity of water and polymer.

2. The method according to claim 1, said method further comprising the step of preventing a flow of water to said polymer source via a polymer check valve disposed between said polymer source and said suction end of said mixing pump.

3. The method according to claim 2, said method further comprising the step of flushing with said second quantity of water a section of recirculation piping coupled to piping at a discharge end of said mixing pump and to piping at an outlet end of said polymer check valve.

4. The method according to claim 1, said method further comprising the step of gravity feeding said first and second quantities of water into said system via a water buffer tank.

5. The method according to claim 1, said method further comprising the steps of:

measuring with a flow meter said first quantity of water provided by said water source; and adjusting a flow of said first quantity of water so as to correspond to said measured flow.

6. The method according to claim 5, said method further comprising the steps of:

receiving via a programmable logic controller an electrical signal from said flow meter; and adjusting said water flow valve so as to regulate said flow of said first quantity of water.

7. The method according to claim 1, said method further comprising the step of providing said second quantity of water, wherein said second quantity of water corresponds to a volume of said piping.

* * * * *